United States Patent
Tan et al.

(10) Patent No.: US 8,923,627 B2
(45) Date of Patent: Dec. 30, 2014

(54) METHOD FOR LOCATING AN ELECTRONIC APPARATUS

(71) Applicants: Siow Kiat Tan, Singapore (SG); Senthilnathan Chinnayegappan, Singapore (SG); Thomas D. Pawlik, Rochester, NY (US)

(72) Inventors: Siow Kiat Tan, Singapore (SG); Senthilnathan Chinnayegappan, Singapore (SG); Thomas D. Pawlik, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 84 days.

(21) Appl. No.: 13/772,380

(22) Filed: Feb. 21, 2013

(65) Prior Publication Data
US 2014/0233861 A1    Aug. 21, 2014

(51) Int. Cl.
*G06K 9/68* (2006.01)
*G06K 15/00* (2006.01)

(52) U.S. Cl.
CPC .................................. *G06K 15/40* (2013.01)
USPC .......................................... 382/218; 382/103

(58) Field of Classification Search
USPC .................................. 382/103, 218; 715/862
See application file for complete search history.

(56) References Cited

U.S. PATENT DOCUMENTS

| | | | |
|---|---|---|---|
| 7,848,765 B2 * | 12/2010 | Phillips et al. | 455/456.3 |
| 8,131,118 B1 * | 3/2012 | Jing et al. | 382/305 |
| 2008/0126573 A1 * | 5/2008 | Matton et al. | 710/3 |
| 2009/0009798 A1 * | 1/2009 | Hasebe | 358/1.15 |
| 2009/0086232 A1 * | 4/2009 | Ohira | 358/1.9 |
| 2014/0171039 A1 * | 6/2014 | Bjontegard | 455/414.1 |

* cited by examiner

*Primary Examiner* — Gregory F Cunningham
(74) *Attorney, Agent, or Firm* — Peyton C. Watkins

(57) ABSTRACT

A method for locating an electronic apparatus, the method includes identifying a mobile communication device that is proximate the electronic apparatus; receiving location information embedded in an image file by the mobile communication device and transferred from the mobile communication device; and storing the location information in the electronic apparatus.

25 Claims, 3 Drawing Sheets

METHOD FOR LOCATING AN ELECTRONIC APPARATUS

FIELD OF THE INVENTION

The present invention relates to an electronic apparatus, such as a multifunction printer, not having integrated location determination capability, and more particularly to a method for locating such an electronic apparatus for subsequently integrating location determination.

BACKGROUND OF THE INVENTION

In recent years there has been a proliferation of mobile devices having built-in location determination capability. Such mobile devices can include GPS (global positioning system) navigation devices for letting the user know his location and what is located nearby, as well as mobile communication devices such as cell phones, smart phones and tablets, where the built-in location determination function is one of a plurality of features that work together to provide a variety of functions. For example, a mobile communication device can include a digital camera, and the built-in location determination capability can be used to tag a digital image with location information (such as GPS coordinates) corresponding to where the image was captured.

Types of electronic apparatus that are less portable and are designed to operate primarily in a particular location tend not to have built-in location determination capability. The additional electronic circuitry would add to the cost of the apparatus. However, it can still be very useful for some types of such stationary electronic apparatus to be able to acquire and store their location. For example, commonly owned co-pending U.S. patent application Ser. No. 13/276,510, entitled "Geographically Based Humidity Adjustment of Printhead Maintenance", (incorporated by reference herein in its entirety) discloses a method of controlling inkjet printhead maintenance based on local humidity conditions which are pertinent to where the inkjet printer is located. In addition, it can be helpful for a wireless printer to be easily located for printing an image from a mobile communication device. On a multifunction printer having a scanning apparatus, it can be useful to be able to tag the scanned images with location information corresponding to where the image was scanned. Furthermore on an electronic apparatus that performs operations of a secure nature, it can be helpful to confirm remotely that the electronic apparatus is located in the secure location where it is expected to be.

Consequently, a need exists for a way to provide location information to an electronic apparatus that does not have built-in location determination capability, and to subsequently be able to use the location information.

SUMMARY OF THE INVENTION

The present invention is directed to overcoming one or more of the problems set forth above. Briefly summarized, according to one aspect of the invention, the invention resides in a method for locating an electronic apparatus, the method includes identifying a mobile communication device that is proximate the electronic apparatus; receiving location information embedded in an image file by the mobile communication device and transferred from the mobile communication device; and storing the location information in the electronic apparatus.

DETAILED DESCRIPTION OF THE INVENTION

Figure 1:
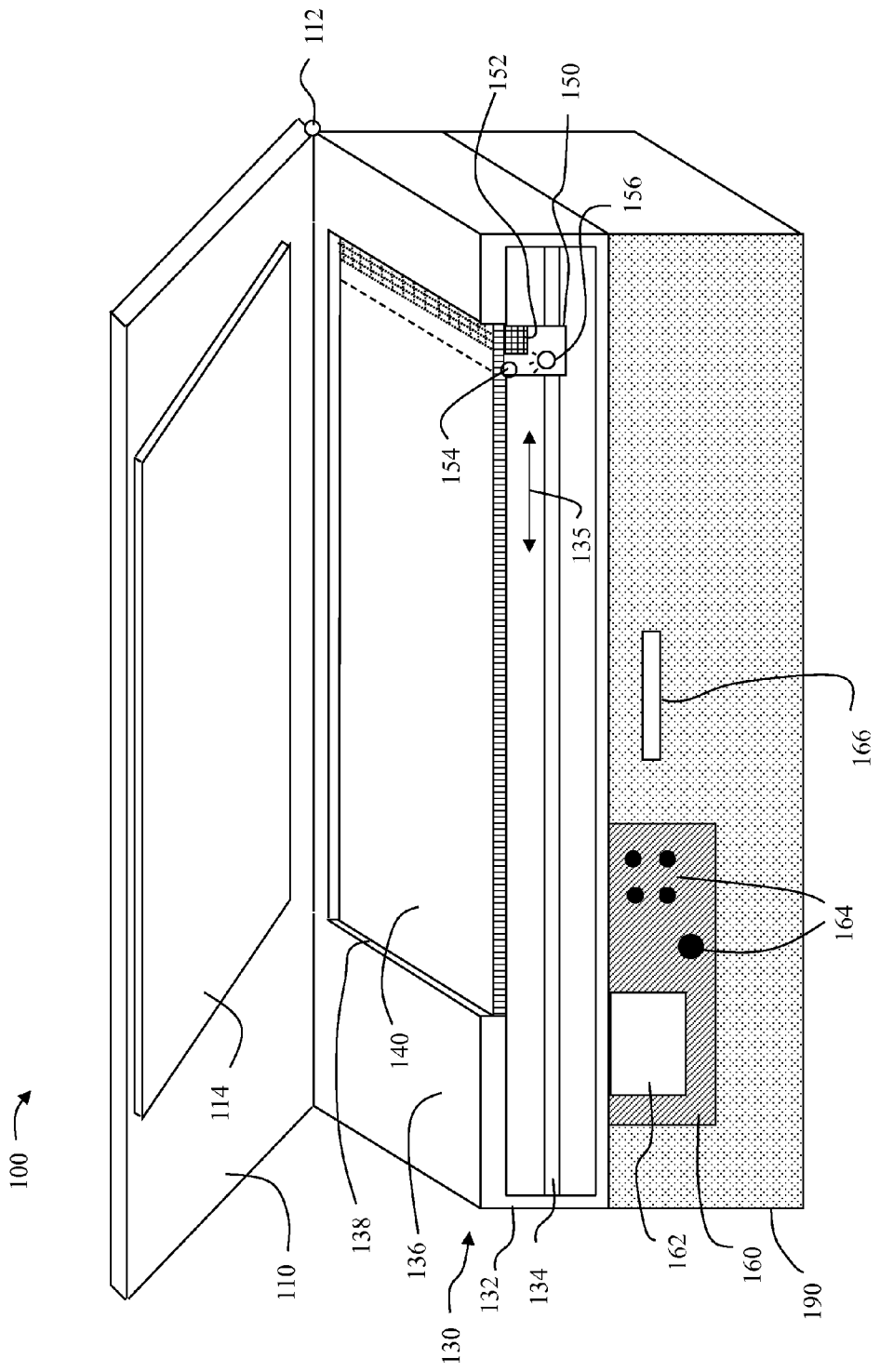
FIG. 1 is a perspective of a multifunction printer.

FIG. 1 shows a perspective of a multifunction printer 100 that can be used in embodiments of the invention. The multifunction printer 100 includes a scanning apparatus 130 for acquiring digitized images of documents or other objects, and a printing apparatus 190, which can be an inkjet printer for example. In this view, the front portion of the scanning apparatus 130 is cut away in order to show internal features of the scanning apparatus 130 more clearly. The multifunction printer 100 can do printing, scanning of documents, or copying of documents (i.e. printing plus scanning).

A user interface 160 for the apparatus is shown in FIG. 1 as being located on the front of the printing apparatus 190, but this was done partly for illustrative purposes so as not to obscure features of the scanning apparatus 130. The user interface 160 could alternatively be located on the top or the front of the scanning apparatus 130 for example. The user interface 160 is associated with a display 162 and a variety of control buttons 164. For cases where the display 162 is a touch screen, the control buttons 164 can be integrated into the touch screen rather than being separate from it. Also shown is a memory device reader 166 for reading memory devices such as memory cards or flash drives when they are inserted. Photos or other electronic images can be directly provided to the multifunction printer 100 through the memory device reader 166.

The scanning apparatus 130 includes a scanning apparatus body 132 and a scanner lid 110, which is joined to the scanning apparatus body 132 by a hinge 112. A surface of the scanning apparatus body 132 that is covered by the scanner lid 110 when the scanner lid 110 is closed includes a frame 136. A transparent platen 140 (typically a flat piece of glass) is inset within the frame 136. In the example shown in FIG. 1, the surface of the transparent platen 140 is lower than the surface of the frame 136 so that there is an offset 138. The transparent platen 140 is not covered by the scanner lid 110 when the scanner lid 110 is open as it is in FIG. 1.

Below the transparent platen 140 is a movable sensor array module 150. In the example shown in FIG. 1, the sensor array module 150 includes a photosensor array (such as a contact image sensor) 152 extending the width of the transparent platen 140, a roller 154 that is biased into contact with the underside of the transparent platen 140, and a light source 156 that illuminates a scan line of a document or other item (not shown) that is placed on top of the transparent platen 140. A light guide (not shown) and other optics (not shown) can also be included in the sensor array module 150. The sensor array module 150 is moved back and forth along a scanning guide 134 in a direction 135 across the length of the transparent platen 140 in order to scan the document or other item, receiving reflected light from the item through the transparent platen 140 scan line by scan line and converting the reflected light into electrical signals. A controller 170 (FIG. 2) converts the electrical signals into digitized data to form a digitized image of the item. The scanning guide 134 can be a round rail, a rack and pinion or other guiding member that can use the power of a motor 176 (FIG. 2) to provide a linear motion along the scanning direction 135. In FIG. 1, the sensor array module 150 is parked in its home position near one end of the transparent platen 140. The home position is where the sensor array module 150 returns between scanning operations.

The scanner lid 110 includes a reflective backing plate 114. The thickness of the reflective backing plate 114 is accommodated in the offset 138 between the frame 136 and the top surface of the transparent platen 140 when the scanner lid 110 is closed. The reflective backing plate 114 can be resiliently mounted on the scanner lid 110, so that the reflective backing plate 114 is effective in pressing documents of various thicknesses against the transparent platen 140. Typically the reflective backing plate 114 is white in the document scanning region. Since many documents are printed on white paper, a white reflective backing plate 114 results in an overall white background even for documents of sizes that are smaller than the scanning region. For other types of objects to be scanned, such as photos, the white reflective backing plate 114 produces a clean background that provides good contrast for the photos. In other scanning apparatus designs, the reflective backing function is integrated into the scanner lid 110.

Figure 2:
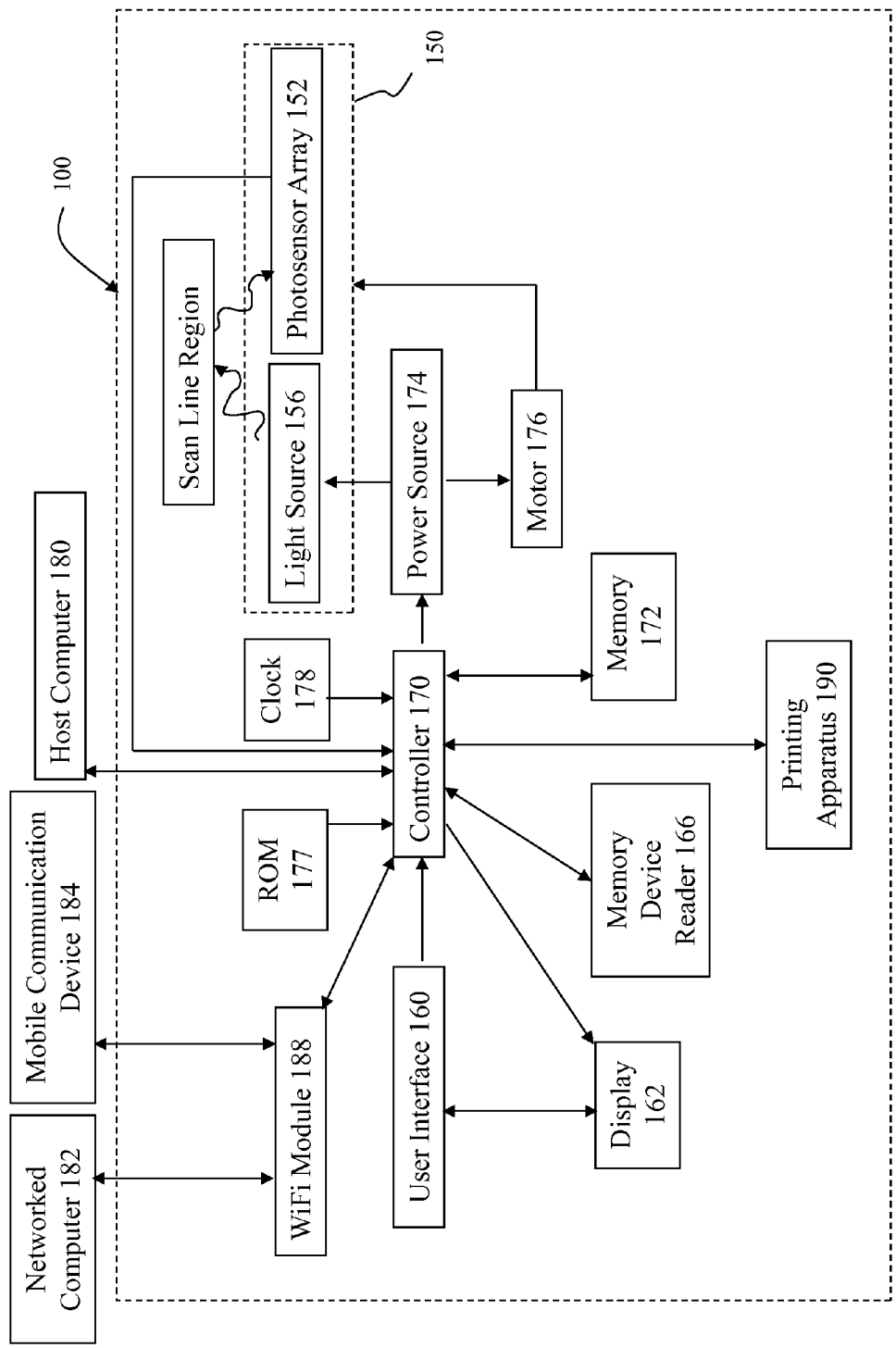
FIG. 2 is a schematic diagram showing how the different parts of the multifunction printer are related to one another and to external devices according to an embodiment of the present invention.

FIG. 2 schematically shows the relationship of components of the multifunction printer 100 and computers (such as a host computer 180 or a networked computer 182) or a mobile communication device 184 to which the multifunction printer 100 is connected. A user can initiate a printing or scanning operation from the user interface 160, or alternatively from the host computer 180 or the networked computer 182 or the mobile communication device 184. For a scanning operation, for example, a signal is sent to the controller 170, which then sends a signal to a power source 174 to turn on the light source 156 and also to operate the motor 176 in order to move the sensor array module 150 along the scanning direction 135 (see FIG. 1). As the sensor array module 150 is moved, light from the light source 156 reflects off a document or other object that is placed on the transparent platen 140 and impinges on the photosensor array 152 one scan line at a time. A scan line signal is sent from the photosensor array 152 to the controller 170 where it can be further processed before sending it to a memory 172 (or to the host computer 180 for example) in order to compose an entire scanned image signal, scan line by scan line. When the scan is completed, the controller 170 sends a signal to the power source 174 to send power to the motor 176 in order to return the sensor array module 150 to its home position. For printing or scanning operations initiated by the networked computer 182 or the mobile communication device 184, data transmission to or from the controller 170 can be done through a WiFi module 188. Alternatively, a hard wire connection (similar to that shown from host computer 180), such as a USB connection, can be provided between the mobile communication device 184 and the controller 170. Operational instructions to the controller 170 can be received from a read only memory 177, as well as from the user interface 160, and from external sources such as the host computer 180, the networked computer 182 and the mobile communication device 184. A clock 178 can be used to properly time various operations. Data can be stored in the memory 172. Instructions, selectable options and images can be provided for the user on the display 162.

Embodiments of the invention include providing location information to the multifunction printer 100 (FIG. 1) or other type of electronic apparatuses 200 (FIG. 3) from the nearby mobile communication device 184 having a built-in location determination module 185. In addition to the built-in location determination module 185, the mobile communication device 184 typically includes a screen 186, a camera 183, a memory card slot 189, and other devices that are not shown, such as a clock, a wireless communication module, a processor and memory. The mobile communication device 184 that is near the electronic apparatus 200 is identified. Typically the mobile communication device 184 can transmit a signal 210 to electronic apparatuses 200, and can receive a signal 212 that is transmitted by the electronic apparatus 200. The mobile communication device 184 sends an image file having embedded location information to the electronic apparatus 200. The location information is stored in the electronic apparatus 200, for example in the memory 172. In some embodiments the nearby mobile communication device 184 is identified by instructing the user to take a picture using the mobile communication device while the mobile communication device 184 is near the electronic apparatus 200. It is not necessary for the electronic apparatus 200 to be in the image captured by the picture. However, as described in more detail below, in order to confirm that the mobile communication device 184 is actually near the electronic apparatus 200, it can be advantageous for electronic apparatus 200 to be in the captured image. It can be further advantageous if the electronic apparatus 200 includes the display 162 on which an image is displayed. If the displayed image is in the captured image, the two images can be compared to confirm that the mobile communication device 184 was near the electronic apparatus 200 when the picture was taken. Types of electronic apparatuses 200 that are capable of displaying an image, such as the multifunction printers 100, televisions (not shown) or computers (not shown) are compatible with such a further advantageous method of providing location information.

Figure 3:
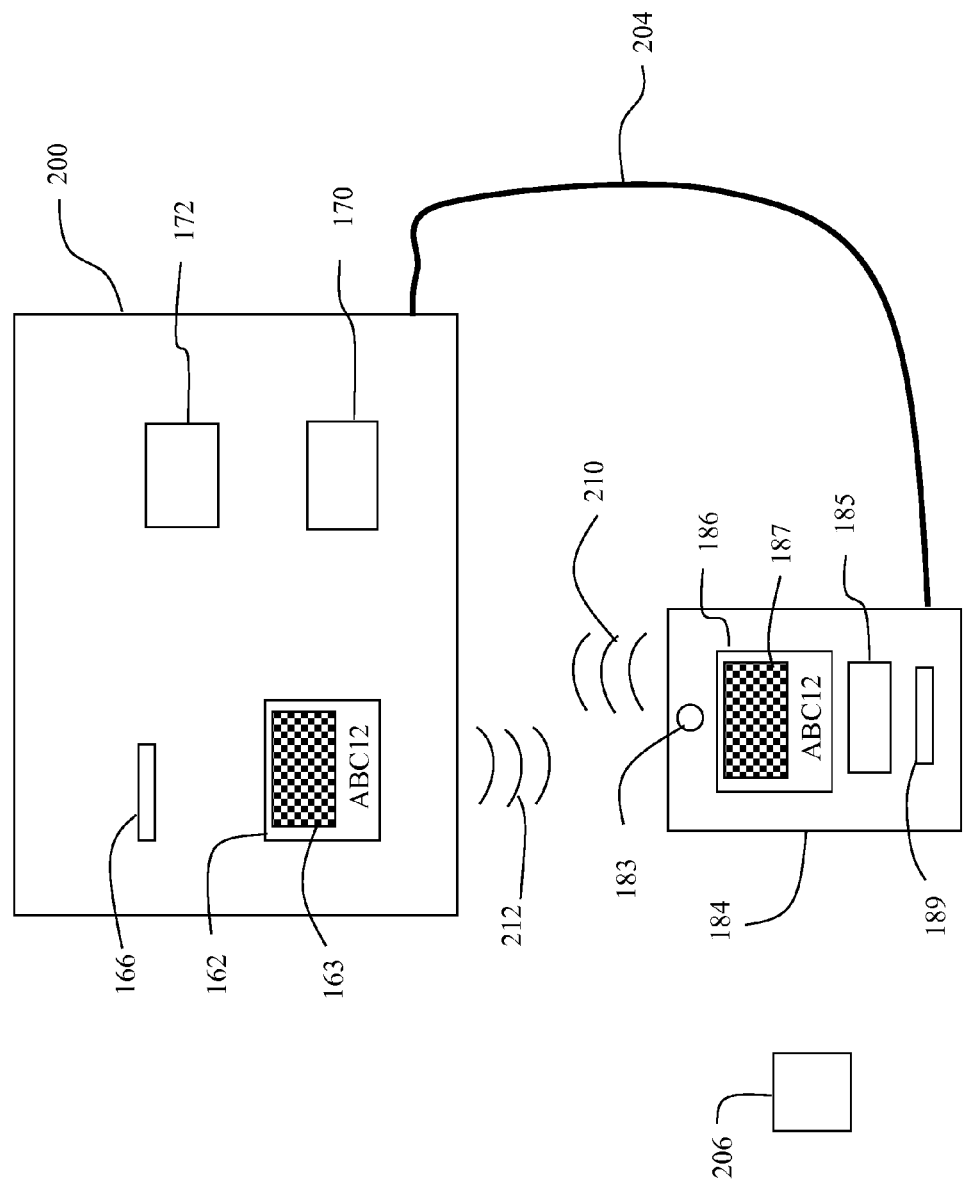
FIG. 3 schematically illustrates a method for providing location information from a mobile communication device to an electronic apparatus according to an embodiment of the invention.

In an embodiment illustrated in FIG. 3, the camera 183 on the mobile communication device 184 is used to capture a displayed image 163. The displayed image 163 can include graphics, alphanumeric characters, or a combination, for example. Optionally, a captured image 187 can be shown on the screen 186 of the mobile communication device 184. More important to the present invention is that the mobile communication device 184 embeds location information, e.g. global positioning system (GPS) position data from the location determination module 185 (e.g. a GPS module) indicating the present location of the mobile communication device 184, into a digital image file associated with the image that was displayed on the electronic apparatus 200 and captured by the mobile communication device 200. In other words, the digital image file includes image data corresponding to the captured image 187 (from taking a picture of displayed image 163), as well as location metadata. The mobile communication device 184 needs to be fairly close to the display 162 of the electronic apparatus 200 so that the captured image 187 adequately corresponds to the displayed image 163, thereby ensuring that location of the mobile communication device 184 when the picture was taken is a good approximation of the location of the electronic apparatus 200.

The captured image 187 is next transferred to the electronic apparatus 200 as part of the image file that also includes location metadata. Transferring the captured image 187 from the mobile communication device 184 to the electronic apparatus 200 can be done as a wireless transmission of digital data, as represented by the signal 210. In some instances (particularly if the electronic apparatus 200 is a multifunction printer 100) the captured image 187 can be sent as part of a printing application on the mobile communication device 184. Such printing applications (such as Kodak's Pic Flick) are readily available for the mobile communication devices 184 for printing pictures or documents on the nearby multifunction printers 100. Since the image file transmitted in such printing applications already includes the location metadata as well as the image data, no special applications are required to be installed on the mobile communications device 184. When the image file is transferred using a printing application, typically the electronic apparatus 200 (such as multifunction printer 100) will print the transferred image. Alternatively, the image file including the captured image 187 can be sent from the mobile communication device 184 to the electronic apparatus 200 as an e-mail attachment. Yet another way to transfer the image file including the captured image 187 from the mobile communication device 184 to the electronic apparatus 200 is through a wired connection 204, such as a USB connection. Still another way to transfer the image file including the captured image 187 from the mobile communication device 184 to the electronic apparatus 200 is to remove a memory card 206 from the memory card slot 189 on the mobile communication device 184, insert the memory card 206 into the memory device reader 166 of the electronic apparatus 200 and read the memory card 206.

In order to verify that the captured image 187 adequately corresponds to the displayed image 163, and that therefore the mobile communication device 184 was near the electronic apparatus 200, the controller 170 can be used to compare the digital image data of the captured image 187 to the digital image data of displayed image 163. Pattern recognition can be used to compare the transferred captured image 187 to the displayed image 163. Further validation can be provided by using the controller 170 to compare a first time corresponding to when the captured image 187 was captured by the mobile communication device 184 to a second time corresponding to when the displayed image 163 was displayed on the electronic apparatus 200. Data corresponding to the first time can be acquired through time metadata in the image file of the captured image 187. Data corresponding to the second time can be acquired from the clock 178 (FIG. 2).

Once the image file including the captured image 187 has been received by the electronic apparatus 200, and optionally compared to the displayed image 163, the location information metadata, such as GPS position data, is extracted from the image file by the controller 170. The location information is then stored in the electronic apparatus 200 in the memory 172.

Once the location information is stored in the electronic apparatus 200, it can be used for a variety of purposes. In the multifunction printer 100 (FIG. 1) having the scanning apparatus 130, a scanned image provided by scanning an item can be tagged with the location information stored in the multifunction printer 100, so that the particular multifunction printer 100 that scanned the item can be identified.

Additionally, the location of the electronic apparatus 200 can be advertised. For example, in the case of the multifunction printer 100, in some network discovery protocols such as Web Services for Devices or Universal Plug and Play, a networked device is able to include its physical location in its device descriptor structure, so that operating systems can present this information. For example, a Windows Print dialog box and the Printers folder may show the "Location" of a printer. An application such as Kodak's Pic Flick on a mobile phone (not necessarily the same as mobile communication device 184) can use its own location and that of discovered networked printers, to show a list of "printers nearby" for the user to choose from for printing an image.

In some instances a user decides to provide location information to the electronic apparatus 200 as described above. The electronic apparatus 200 provides a selectable option on the user interface 160 (FIG. 2) for setting location information for the electronic apparatus 200. Once the user selects the option for setting location information, electronic apparatus 200 instructs the user to take a picture near electronic apparatus 200 (optionally of an image displayed on display 160) and transfer the image file to the electronic apparatus 200 so that the process described above can be carried out.

In other instances the request to determine the location of the electronic apparatus 200 is made via a remote networked computer 182 (FIG. 2). This can be especially useful when the electronic apparatus 200 performs functions that are security related. For example, the electronic apparatus 200 can be the multifunction printer 100 that includes special marking capability (such as a type of special ink) that can be used to print hidden code information on a label that can be used to designate authentic items. A special barcode reader, for example, can be used to check the label to verify that the hidden code is present, thereby verifying the authenticity of the item. For such a system it is important that the multifunction printer 100 not be permitted to falsely designate counterfeit items as authentic items.

The security of the multifunction printer 100 can be improved if it can be verified that the multifunction printer 100 remains in a known secure location rather than being removed from the premises. Location information stored on the electronic apparatus 200 (such as the multifunction printer 100) can be monitored using the remote networked computer 182. On an as-needed basis, the remote networked computer 182 can send an instruction to the electronic apparatus 200 to display a predetermined image on the display 162 of the electronic apparatus 200. The predetermined image would typically be known at the site of the remote networked computer 182, but unknown at the site of the electronic apparatus 200 until it was displayed. The remote networked computer 182 could also send an instruction to take a picture of the displayed predetermined image using the mobile communication device 184. After the image is captured, the mobile communication device 184 transfers the image file for extraction of the location information. Optionally, the mobile communication device 184 could send the image file directly to the networked computer 182 for extraction of the location information, or it could transfer the image file to the electronic apparatus 200 for extraction of the location information, so that the location information can be sent from the electronic apparatus 200 to the remote networked computer 182. In any case, the location information of the electronic apparatus 200 is sent to the remote networked computer 182.

The remote networked computer 182 compares the location information from the image file corresponding to the captured image of the displayed predetermined image to a known location of the electronic apparatus 200 stored on the networked computer. If the location information from the image file corresponds to the known location within a specified limit, then the remote networked computer 182 authorizes the electronic apparatus 200 to perform a function. For example, if the electronic apparatus 200 is the multifunction printer 100, the function can be printing the hidden code, as mentioned above, for designating authentic items. The specified limit within which authorization is provided depends upon accuracy of the location coordinates, variability of the distance from the electronic apparatus at which the picture is taken, and the permitting movement of the electronic apparatus within prescribed limits. For providing further degrees of security, authorization to perform the function can be terminated after a predetermined time has elapsed, or after the function has been performed for a predetermined number of instances. To authorize performing the function again, it would be necessary to confirm the location of the electronic apparatus 200 again as described above.

The present invention has been described in detail with particular reference to certain preferred embodiments thereof, but it will be understood that variations and modifications can be effected within the spirit and scope of the invention.

PARTS LIST

100 Multifunction printer
110 Scanner lid
112 Hinge
114 Reflective backing plate
130 Scanning apparatus
132 Scanning apparatus body
134 Scanning guide
135 Scanning direction
136 Frame
138 Offset (for reflective backing plate)
140 Transparent platen
150 Sensor array module
152 Photosensor array
154 Roller of sensor array module
156 Light source
160 User interface
162 Display
163 Displayed image
164 Control buttons
166 Memory device reader
170 Controller (system manager)
172 Memory
174 Power source
176 Motor
177 Read Only Memory (ROM)
178 Clock
180 Host computer
182 Networked computer
183 Camera
184 Mobile communication device
185 Location determination module
186 Screen
187 Captured image
188 WiFi module
189 Memory card slot
190 Printing apparatus
200 Electronic apparatus
204 Wired connection
206 Memory card
210 Signal (transmitted from mobile communication device)
212 Signal (transmitted from electronic apparatus)

The invention claimed is:

1. A method for locating a multifunctional printer, the method comprising:
   identifying a mobile communication device that is proximate the multifunctional printer;
   receiving location information embedded in an image file by the mobile communication device and transferred from the mobile communication device;
   storing the location information in the multifunctional printer;
   scanning an item using a scanner of the multifunction printer to provide a scanned image; and
   tagging the scanned image with the location information stored in the multifunction printer.

2. The method according to claim 1 further comprising:
   displaying an image on the multifunctional printer; and
   capturing the displayed image by a camera on the mobile communication device.

3. The method according to claim 2 further comprising transferring the captured image to the multifunctional printer, wherein the image file includes the captured image.

4. The method according to claim 3, wherein transferring the captured image to the multifunctional printer includes wirelessly transmitting the captured image.

5. The method according to claim 3, wherein transferring the captured image to the multifunctional printer includes sending the captured image through a wired connection between the mobile communication device and the multifunctional printer.

6. The method according to claim 3, wherein transferring the captured image to the multifunctional printer includes:
   removing a memory card from the mobile communication device;
   inserting the memory card into the multifunctional printer; and
   reading the memory card.

7. The method according to claim 3, wherein transferring the captured image to the multifunctional printer includes sending an e-mail attachment to the multifunctional printer.

8. The method according to claim 3, further comprising using a controller in the multifunctional printer to compare the transferred image to the displayed image.

9. The method according to claim 3 further comprising using pattern recognition to compare the transferred image to the displayed image.

10. The method according to claim 3 further comprising using a controller in the multifunctional printer to compare a first time corresponding to when the image was captured to a second time corresponding to when the image was displayed.

11. The method according to claim 3 further comprising using the multifunctional printer to print the transferred image.

12. The method according to claim 1 further comprising using a controller in the multifunctional printer to extract the location information from the image file.

13. The method according to claim 1, wherein the location information includes GPS position data.

14. The method according to claim 1 further comprising advertising the location of the multifunctional printer.

15. The method according to claim 14, wherein advertising the location of the multifunctional printer includes providing a physical location of the multifunctional printer to a network.

16. A method for locating an electronic apparatus, the method comprising:
   identifying a mobile communication device that is proximate the electronic apparatus;
   receiving location information embedded in an image file by the mobile communication device and transferred from the mobile communication device;
   storing the location information in the electronic apparatus;
   monitoring the stored location information on the electronic apparatus using a networked computer;
   sending an instruction from the networked computer to the electronic apparatus to display a predetermined image on the electronic apparatus;
   capturing an image of the displayed predetermined image; and
   sending, location information of the electronic apparatus to the networked computer.

17. The method according to claim 16 further comprising:
comparing the location information from the image file corresponding to the captured image of the displayed predetermined image to a known location stored on the networked computer; and
authorizing the electronic apparatus to perform a function if the location information corresponds to the known location within a specified limit.

18. The method according to claim 17 further comprising terminating authorization to perform the function after a predetermined period of time has elapsed.

19. The method according to claim 17 further comprising terminating authorization to perform the function after the function has been performed for a predetermined number of instances.

20. The method according to claim 16, wherein the electronic apparatus includes a computer.

21. The method according to claim 16, wherein the electronic apparatus includes a television.

22. The method according to claim 1 further comprising providing a selectable option on user interface of the multi-functional printer for setting location information.

23. The method according to claim 16 further comprising transferring the captured image to the electronic apparatus, wherein the image file includes the captured image.

24. The method according to claim 23 further comprising using a controller in the electronic apparatus to compare a first time corresponding to when the image was captured to a second time corresponding to when the image was displayed.

25. The method according to claim 16 further comprising providing a selectable option on user interface of the electronic apparatus for setting location information.

* * * * *